(12) United States Patent
Harcar et al.

(10) Patent No.: US 9,990,605 B2
(45) Date of Patent: Jun. 5, 2018

(54) SYSTEMS AND METHODS FOR LABELING CONSUMER ITEMS WITH UNIQUE IDENTIFIERS

(71) Applicant: Wal-Mart Stores, Inc., Bentonville, AR (US)

(72) Inventors: Mustafa A. Harcar, Centerton, AR (US); Andrew J. Rizkallah, Bentonville, AR (US); Olivia H. Bozik, Piedmont, SC (US); Bryan J. Rogers, Centerton, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days. days.

(21) Appl. No.: 15/490,269

(22) Filed: Apr. 18, 2017

(65) Prior Publication Data

US 2017/0300854 A1    Oct. 19, 2017

Related U.S. Application Data

(60) Provisional application No. 62/324,552, filed on Apr. 19, 2016.

(51) Int. Cl.
*G06F 19/00* (2018.01)
*G06Q 30/00* (2012.01)
*G06Q 90/00* (2006.01)
*G06Q 10/08* (2012.01)
*G06K 7/10* (2006.01)
*G06K 19/06* (2006.01)

(52) U.S. Cl.
CPC ....... *G06Q 10/087* (2013.01); *G06K 7/10762* (2013.01); *G06K 7/10861* (2013.01); *G06K 19/06103* (2013.01)

(58) Field of Classification Search
CPC ......... G06F 19/00; G06F 17/00; G06Q 30/00; G06Q 90/00; G06K 19/00
USPC ................. 235/385, 375, 487; 705/14.28, 28
See application file for complete search history.

(56) References Cited

U.S. PATENT DOCUMENTS

| | | | |
|---|---|---|---|
| 5,646,389 A * | 7/1997 | Bravman | ............... G06K 1/126 235/383 |
| 5,671,362 A | 9/1997 | Cowe | |
| 7,303,123 B2 | 12/2007 | Roberts | |

(Continued)

OTHER PUBLICATIONS

"How to assign SKUs and UPCs"; http://fashion-incubator.com/how-to-assign-skus-and-upcs/; published on Aug. 27, 2009; pp. 1-8.

(Continued)

*Primary Examiner* — Edwyn Labaze
(74) *Attorney, Agent, or Firm* — Fitch, Even, Tabin & Flannery LLP

(57) ABSTRACT

In some embodiments, methods of tracking uniquely labeled products are provided. An item representing one unit of a consumer product may be labeled with a unique label via automatically generating a random identifier unique to the item, associating the randomly-generated identifier with the item in a record of an electronic database, creating a label comprising a substrate and the randomly-generated identifier, applying the label to the item, and tracking the item via obtaining the randomly-generated identifier from the label. Products labeled with unique identifiers via such methods are also provided.

20 Claims, 4 Drawing Sheets

(56) References Cited

U.S. PATENT DOCUMENTS

| | | | |
|---|---|---|---|
| 7,347,361 B2 | 3/2008 | Lovett | |
| 7,543,741 B2 | 6/2009 | Lovett | |
| 7,810,720 B2 | 10/2010 | Lovett | |
| 2004/0210493 A1* | 10/2004 | Sherman | G06Q 10/087 705/28 |
| 2010/0059533 A1* | 3/2010 | Unger | B01L 3/52 220/694 |
| 2012/0141660 A1* | 6/2012 | Fiedler | G06K 7/1434 427/8 |
| 2012/0191817 A1 | 7/2012 | Sayan | |
| 2013/0138491 A1* | 5/2013 | Gao | G06Q 30/0225 705/14.23 |
| 2013/0173430 A1 | 7/2013 | Benjamin | |
| 2014/0035724 A1* | 2/2014 | Rothschild | G01S 13/75 340/8.1 |
| 2014/0278863 A1 | 9/2014 | Katan | |
| 2014/0330685 A1 | 11/2014 | Nazzari | |
| 2014/0374478 A1 | 12/2014 | Dearing | |
| 2015/0302421 A1* | 10/2015 | Caton | G06Q 30/018 705/17 |
| 2016/0269182 A1* | 9/2016 | Sriram | H04L 9/3242 |
| 2016/0321677 A1* | 11/2016 | Dobaj | G06Q 30/0185 |

OTHER PUBLICATIONS

Montoya, Ronald; "Hot to Make Sense of Your Car's VIN"; https://www.edmunds.com/driving-tips/makeing-sense-of-your-vin.html; Sep. 11, 2013; pp. 1-5.

* cited by examiner

SYSTEMS AND METHODS FOR LABELING CONSUMER ITEMS WITH UNIQUE IDENTIFIERS

CROSS-REFERENCE TO RELATED APPLICATION

This application claims the benefit of U.S. Provisional Application No. 62/324,552, filed Apr. 19, 2016, which is incorporated herein by reference in its entirety.

TECHNICAL FIELD

This disclosure relate generally to consumer item labels and more particularly to devices, systems and methods for tracking consumer item labeled with unique randomly-generated identifiers.

BACKGROUND

Retailer facilities such as large department stores and warehouses and distribution centers associated therewith receive, stock, and transport thousands, if not millions, of units of consumer products. An individual stock keeping unit or item of a consumer product typically includes a label attached thereto or printed thereon indicating the identifying code of the consumer product. For example, a bottle of a typical shampoo product displayed on a sales floor of a retailer facility typically includes a label including a uniform product code (UPC) thereon that generally indicates a company code associated with the manufacturer of the shampoo bottle and a product code associated with the shampoo bottle.

A disadvantage of such labels is that the UPC does not include any information distinguishing an individual unit of the shampoo product on the sales floor at a retailer facility from an identical unit of the shampoo product found in a storage bin or on a delivery truck going the retailer facility. In other words, when a worker at a retailer facility scans such a conventional label on an item found loose on the floor at the retailer facility, the worker would not know whether this item was dropped by a worker tasked with bringing this item to the sales floor to be displayed or to the stock room to be stored. Given that the very large number of items handled at a typical retailer facility on a daily basis, it is not unusual for various items to be misplaced, and the conventional labels do not enable a worker to determine the origin and/or the intended destination of a misplaced item, or to determine which worker last handled the misplaced item.

In addition, conventional UPC-based labels are subject to variation associated with errors in worker tasks performed with respect to the items and/or inaccuracies in packing the items to be delivered to a retail sales facility at a vendor facility. Although this variation is managed through an audit process of a percentage of cases, such an audit process is subject to inaccuracies and does not ensure that each unit of a product at a retail sales facility is accounted for.

BRIEF DESCRIPTION OF THE DRAWINGS

Disclosed herein are embodiments of systems, apparatuses and methods pertaining to labeling a consumer product with a label including a randomly-generated unique identifier and tracking products including such labels. This description includes drawings, wherein.

Figure 1:
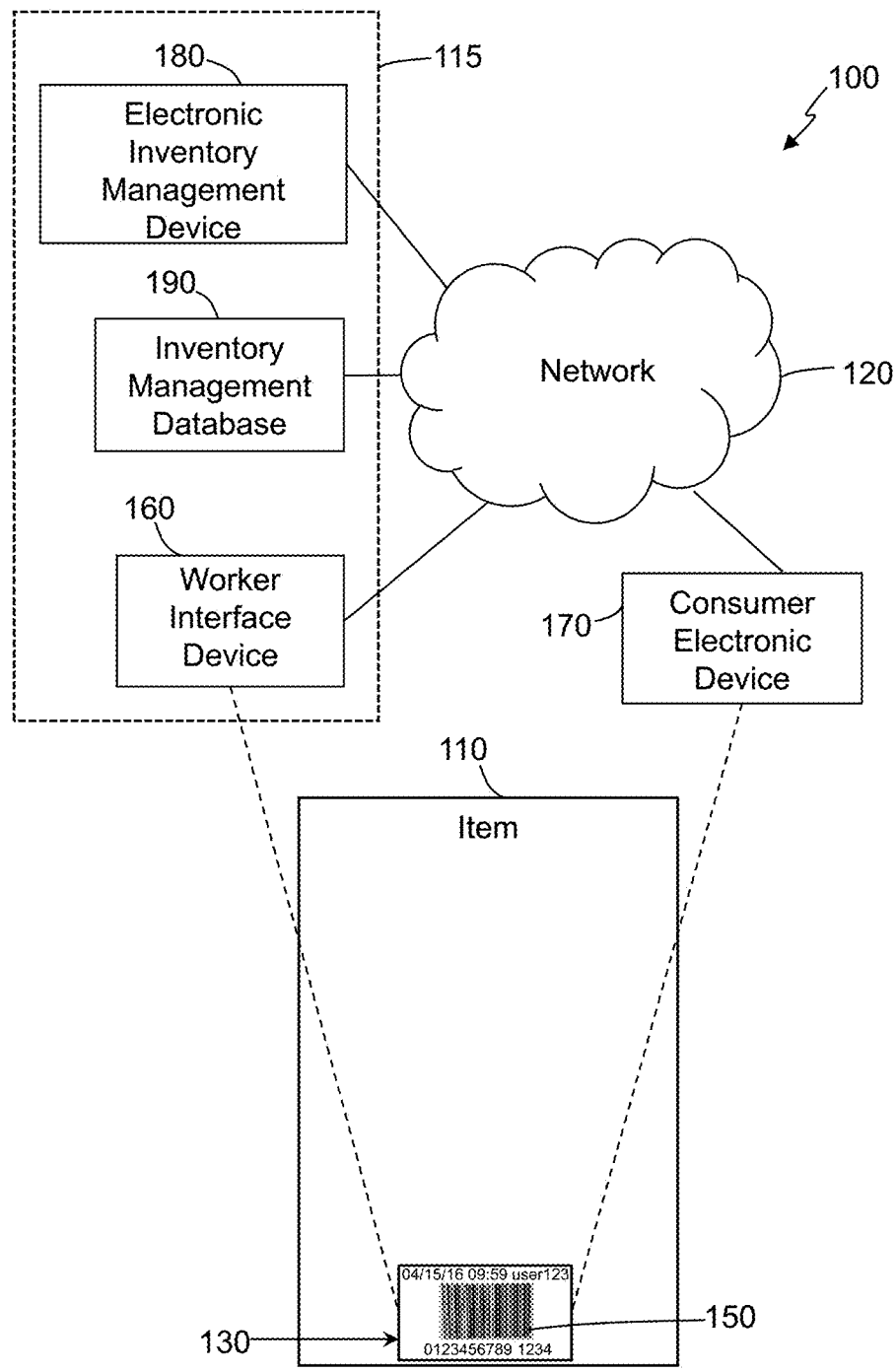
FIG. 1 is a diagram of a system of tracking a consumer item labeled with a unique randomly-generated identifier in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common, well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, methods of tracking retail items labeled with unique randomly-generated identifiers, and units of retail items provided with labels that include a unique randomly-generated identifier are described.

In one embodiment, a system for tracking retail items labeled with unique randomly-generated identifiers includes: a plurality of retail items each being one unit of a consumer product and including a label comprising a substrate and a randomly-generated identifier unique to the retail item; an inventory management database configured to store a plurality of randomly-generated identifiers unique to the labels of the retail items, wherein the randomly-generated identifiers on the labels do not identify the retail items or the consumer products independent of the association of the randomly-generated identifiers with the retail items in the inventory management database; and a computing device including a programmable processor and being programmed to obtain, in response to a scan of at least one label of at least one of the retail items at a retailer facility by an electronic device, at least one of the randomly-generated identifiers associated with the scanned at least one label from the inventory management database in order to track the at least one of the retail items associated in the inventory management database with the obtained at least one of the randomly-generated identifiers.

In another embodiment, a method of tracking retail items labeled with unique randomly-generated identifiers includes: providing each of the retail items, each retail item being one unit of a consumer product, with a label including a substrate and a randomly-generated identifier unique to each of the retail items; providing an inventory management database configured to store a plurality of randomly-generated identifiers unique to the labels of the retail items, wherein the randomly-generated identifiers on the labels do not identify the retail items or the consumer products independent of the association of the randomly-generated identifiers with the retail items in the inventory management database; providing a computing device including a programmable processor; obtaining, via the computing device and in response to a scan of at least one label of at least one of the retail items at a retailer facility by an electronic device, at least one of the randomly-generated identifiers associated with the scanned at least one label from the inventory management database; and tracking the at least one of the retail items associated in the inventory management database with the obtained at least one of the randomly-generated identifiers.

Figure 2:
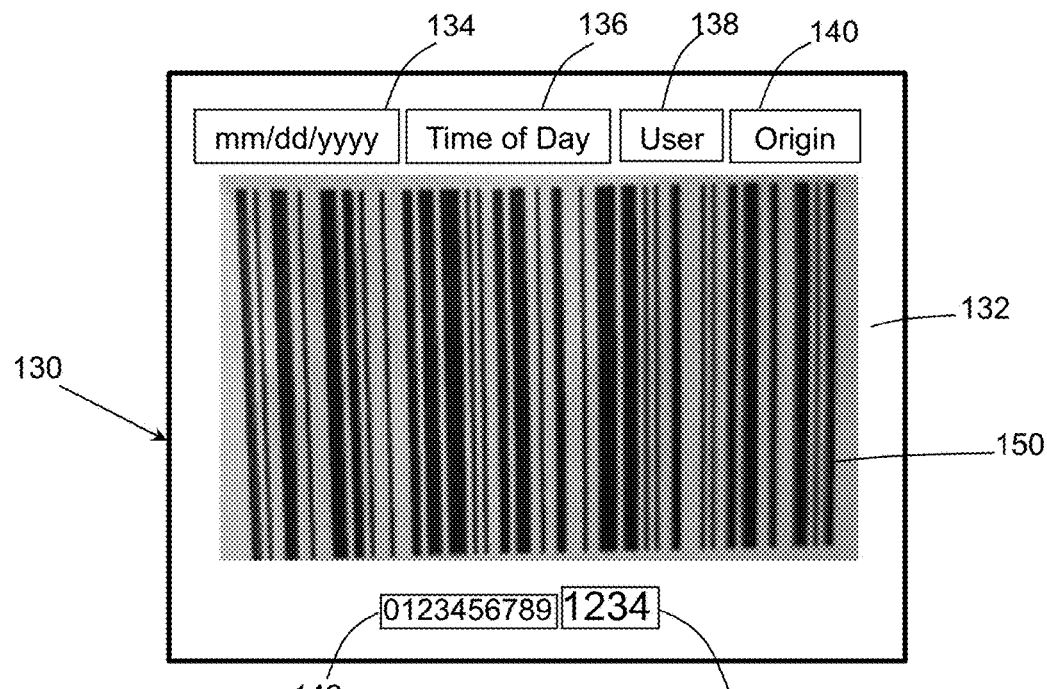
FIG. 2 illustrates an enlarged view of the exemplary product label of FIG. 1.

FIG. 1 shows an embodiment of an individual stock keeping unit (SKU) or item 110 of a consumer product including a label 130 usable for coupling to the item 110 in order to uniquely identify the item 110. The item 110 is shown in FIG. 1 in the context of a system 100 for tracking the item 110, which will be described in more detail below. FIG. 2 depicts the exemplary label 130 of the item 110 in more detail. It will be understood that the term "item" herein refers not only to the physical item 110 itself, but may include any packaging that is associated with the item 110.

As shown in FIG. 2, the exemplary label 130 includes a substrate 132. The substrate 132 may include one side (shown in FIG. 2) having printed indicia thereon and an opposite side (not visible in FIG. 2) having an adhesive material thereon that permits the label 130 to be attached to the item 110. In some embodiments, the substrate 132 of the label 130 may be configured to include an adhesive that permits a consumer to remove the label 130 from the item 110 without ripping and/or otherwise damaging the label 130 or the item 110 or the packaging of the item 110. In some embodiments, the substrate 132 of the label 130 may be configured to include an adhesive that does not permit the consumer to remove the label 130 from the item 110 without ripping and/or otherwise damaging the label 130 or the item 110 or the packaging of the item 110. In some embodiments, the label 130 may be removed from the item 110 by a worker at a retailer facility 115 prior to shipment to the consumer. As used herein, a retailer facility 115 as shown in FIG. 1 may be any place of business such as a store, warehouse, sorting, and/or distribution facility where consumer products may be stocked, and/or sold, and/or shipped to or from.

The exemplary label 130 of FIG. 2 includes a date stamp 134 indicating a date when the label 130 was generated and placed on the item 110, a time stamp 136 indicating a time when the label 130 was placed on the item 110, a user stamp 138 indicating a user (e.g., worker at a retailer facility 115) who placed the label 130 on the item 110, and an origin stamp 140 indicating a location (e.g., vendor facility, specific retailer facility, or the like) where the label 130 was placed on the item 110. Notably, the label 130 may be generated and placed on an item 110 at any facility where an item 110 may be received, shipped from, and/or otherwise processed. It will be appreciated that the label 130 does not have to include all four of the stamps 134, 136, 138, and 140 shown in FIG. 2, and that the labels 130 may include only one stamp (e.g., date stamp 134), only two stamps (e.g., time stamp 136 and user stamp 138), only three stamps (e.g., date stamp 134, user stamp 138, and origin stamp 140), and more than four stamps (e.g., five or more).

Figure 3:
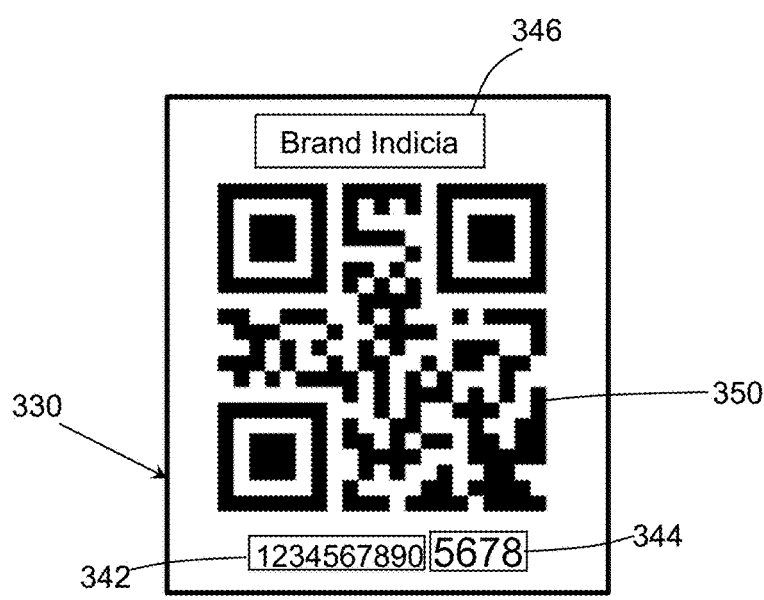
FIG. 3 illustrates an illustration of an exemplary product label in accordance with some embodiments.

With reference to FIG. 2, the exemplary label 130 includes a randomly-generated identifier 150 that uniquely identifies the item 110. In the embodiment of FIG. 2, the randomly-generated identifier 150 is in the form of a barcode. It will be appreciated that the randomly-generated identifier 150 may be represented by way of any other suitable indicia that may be readable by electronic label readers (e.g., barcode readers, radio frequency identification (RFID) readers, near field communication (NFC) readers, ultra-wideband (UWB) readers, image/video readers, or the like readers). For example, in the embodiment shown in FIG. 3, the label 330 may include a randomly-generated identifier 350 in the form of a quick response (QR) code. In the embodiments shown in FIGS. 2 and 3, the exemplary label 130 also includes the randomly-generated identifier 150 in the form of alphanumeric characters 142 and 144. In FIGS. 2 and 3, the alphanumeric characters 142 and 144 together represent the same unique randomly-generated identifier 150 represented by the barcode and QR code, respectively, but in alphanumeric form (e.g., to permit an operator or scanner to read the alphanumeric characters 142 and 144 instead of the barcode or QR code, if appropriate). In FIGS. 2 and 3, the alphanumeric characters 144 are shown in a slightly large size on the label 130 to make the last four digits of the of the randomly-generated identifier 150 represented by the alphanumeric characters 144 easier to see for an operator and/or a scanning device. It will be appreciated that the alphanumeric characters 144 may be the same size as the alphanumeric characters 142 in some embodiments. It will also be appreciated that the alphanumeric characters 142 and 144 on the labels 130 and 330 of FIGS. 2 and 3, respectively, are optional, and may be omitted from the labels 130 and 330, such that the unique randomly-generated identifier 150 is only readable from the barcode on the label 130 and from the QR code on the label 330. It will be appreciated that in some embodiments, non-alphanumeric graphical patterns such as one or more lines or other geometric or irregular shapes, a radio frequency identification (RFID) tag, smart label, or the like.

The randomly generated identifier 150 on a label 130 of each item 110 uniquely identifies each item 110 separately and differentiates otherwise identical items 110 representing an identical product or SKU from each other. Since each item 110 is identifiable by a unique randomly generated identifier 150, each item 110 may be systematically indicated as being assigned to a specific transport unit, storage location (e.g., at a retailer facility 115), consolidation location, shipping package, customer order or the like. In some embodiments, the unique randomly generated identifier 150 on the label 130 of the item 110 provides tracking information for the item 110, whether the item 110 is being processed in receiving (e.g., from a manufacturer), storage (e.g., in a stock room), replenishment (e.g., delivery to the retailer facility 115), and order-filling (e.g., item sorting), consolidation (e.g., grouping multiple items 110 going to one customer), and shipping (e.g., via delivery trucks). In some embodiments, the unique randomly generated identifier 150 on the label 130 of the item 110 enables a customer who ordered the item 110 to track the item 110 during order processing and delivery of the item 110 to the customer.

For example, the randomly generated identifiers 150 on the labels 130 enable workers at a retailer facility 115 to identify a specific SKU or item 110 the workers are intending to handle (e.g., to pack for delivery to a customer) by using the unique identifiers 150 to verify that a correct item 110 is being handled. Such verification may be performed by the worker by way of using an electronic device that (e.g., visually, physically, digitally, etc.) interacts with the identifier 150 on the label 130, as will be described in more detail below.

In some embodiments, the label 130 may include brand and/or $3^{rd}$ party vendor indicia for the item 110. For example, such brand indicia may include the identification of a manufacturer that produced the item. In some embodiments, $3^{rd}$ party indicia on the label 130 may be utilized to correctly charge inventory for use in 3rd party vendor logistics support including but not limited to shrink, storage rent cost, 3rd party vendor inventory management, and the like. In some embodiments, the brand indicia and/or $3^{rd}$ party vendor indicia may be incorporated into the randomly-generated identifier, such that when the randomly-generated identifier is scanned. In some embodiments, the brand indicia 346 may be visibly separate from the randomly-generated identifier.

In one approach, the randomly-generated identifier 150 does not represent a UPC associated with the consumer product associated with the item 110, and the label 130 does not include the UPC associated with the consumer product associated with the item 110. In other words, if the consumer product 300 is a bottle of Head & Shoulders® shampoo, which has a well-established UPC that appears on each conventional bottle (i.e., item) of the Head & Shoulders® shampoo, the label 130 according to the present disclosure does not include the UPC that would identify the bottle as Head & Shoulders® shampoo. Instead, the randomly generated identifier 150 would not only identify the bottle as Head & Shoulders® shampoo, but as a specific bottle head & Shoulders® shampoo.

In some embodiments, the randomly generated identifier 150 on the label 130 of an item 110 may indicate the condition of the item 110. For example, the identifier 150 may indicate whether the item 110 is a brand new item, a refurbished item, or a used item. In some embodiments, the label 130 on an item 110 may include various item-specific information. For example, the item-specific information may include but is not limited to a location of the item 110 (e.g., storage bin, sales floor, delivery truck, etc.), a status of the item 110 (e.g., stored in stock room, displayed on sales floor, sold to a customer, being delivered to the customer, etc.), an expiration date of the item 110, an identification of a delivery vehicle used to transport the item 110 (e.g., to or from a retailer facility 115, to or from a customer, etc.), a sales velocity of the item 110 at the retailer facility 115 for a given time period, and an identification of every worker (e.g., first and last name and/or user handle) who handled the item 110.

In some embodiments, the label 130 is configured such that the randomly-generated identifier 150 on the label 130 is scanable by an electronic device. Some examples of such electronic devices are shown in FIG. 1. With reference to FIG. 1, electronic devices that may be used to scan the label 130 of an item to read the identifier 150 on the label 130 include a worker interface device 160 and a consumer electronic device 170. For example, a worker handling an item 110 having the label 130 thereon may scan the item 110 to read the unique randomly-generated identifier 150 on the item 110 and determine various inventory management information relating to the item 110 as described above.

With reference to FIG. 1, an exemplary system 100 of tracking items 110 including labels 130 having unique identifiers 150 includes an electronic inventory management device 180 that facilitates the tracking of the items 110 at a retailer facility 115. The electronic inventory management device 180 of FIG. 1 may be a stationary or portable electronic device, for example, a desktop computer, a laptop computer, a tablet, a mobile phone, or any other electronic device including a processor-based control circuit (i.e., control unit). The electronic inventory management device 180 may include and/or couple to one or more wired and/or wireless distributed communication network 120 (e.g., wide area network (WAN), local area network (LAN), wireless local area network (WLAN), Internet, cellular, other such networks, and combinations of such networks). The electronic inventory management device 180 is configured for data entry and one-way and/or two-way communication via the communication network 120 with, for example, an inventory management database 190, a worker interface device 160, a consumer electronic device 170, and/or any other electronic device (e.g., regional and/or central server) located at the retailer facility 115 or remote to the retailer facility 115.

In the embodiment shown in FIG. 1, the system 100 includes an inventory management database 190 configured to store electronic information associated with the items 110 at the retailer facility 115, as well as the labels 130 associated with the items 110 at the retailer facility 115. The inventory management database 190 may store electronic data including: randomly-generated identifiers 150 associated with the items 110, product identification codes associated with the items 110, manufacturer codes associated with the items 110, location and/or status of the items 110 (e.g., sold, shipped, stored in stock room, displayed on sales floor, on a delivery truck, etc.), condition of the items 110 (e.g., new, used, refurbished, etc.), and the like. In other words, a unique randomly-generated identifier 150 associated with an item 110 in the electronic database 190 of FIG. 1 may further be associated in the electronic database 190 to one or more of a manufacturer identification code (e.g., Procter & Gamble), a product identification code (e.g., shampoo), and additional data (e.g., location, condition, status, expiration date, etc.) associated with the item 110. In some embodiments, the unique randomly-generated identifier 150 does not identify the individual item 110 or the consumer product represented by the item 110 in general independent of the association of the unique randomly-generated identifier 150 with the item 110 in the electronic database 190.

While the inventory management database 190 is shown in FIG. 1 as being separate from the electronic inventory management device 180 and in communication with the electronic inventory management device 180 via the communication network 120, it will be appreciated that the inventory management database 190 may be physically incorporated into and/or be electrically coupled (e.g., via a cable) to the electronic inventory management device 180. In addition, while one inventory management database 190 is shown in FIG. 1, the inventory management database 190 may include two or more separate databases that are in communication with each other.

The inventory management database 190 may be stored, for example, on non-volatile storage media (e.g., a hard drive, flash drive, or removable optical disk) internal to or external to relative to the electronic inventory management device 180. The inventory management database 190 may be stored on one or more servers or may be cloud-based. In some embodiments, the electronic data stored in the inventory management database 190 may be received from the electronic inventory management device 180. In some embodiments, the electronic data stored in the inventory management database 190 may be transmitted to the inventory management database 190 from another device such as the worker interface device 160.

In the embodiment of FIG. 1, the item 110 includes a label 130 affixed to the item 110 as discussed above. An item 110 may be received at the retailer facility 115 from a vendor (e.g., manufacturer or distributor) with or without including such labels 130. In other words, the label 130 may be generated and affixed to an item 110 at a vendor facility, or may be generated and affixed to the item 110 at a retailer facility 115. It will be understood that the physical location of the label 130 on the item 110 in FIG. 1 is illustrated by way of example only, and that the label 130 may be placed on any suitable location on a front, rear, or either side of the item 110.

The electronic inventory management device 180 is in communication via the network 120 with one or more worker interface device 160 and/or one or more consumer electronic device 170. Generally, the worker interface device 160 and the consumer electronic device 170 can be any electronic device configured for scanning a label 130 on an item 110 in order to read the unique randomly-generated identifier 150 on the label 130, and for wired and/or wireless communication with the electronic inventory management device 180. The worker interface device 180 may allow a worker at a retailer facility 115 to communicate with the electronic inventory management device 180 to receive and/or transmit information and communication associated with the labels 130 and/or the tracking of the items 110 associated with the labels 130 at the retailer facility 115, and to communicate with the inventory management database 190.

In some embodiments, the label 130 of FIG. 2 may be configured such that a scan of the randomly-generated identifier 150 by a consumer electronic device 170 results in the addition of an item 110 associated with the label 130 to a virtual shopping cart of a consumer for purchase. In some embodiments, the label 130 may be configured such that a scan of the randomly-generated identifier 150 by the consumer electronic device 170 results in an automatic reorder of the item 110 associated with the label 130 for the consumer. Such addition of the scanned item 110 to the virtual shopping cart of the consumer and/or automatic reorder of the scanned item 110 is communicated from the consumer electronic device 170 to the electronic inventory management device 180 and/or to the inventory management database 190 to effectuate a real-time update of the electronic inventory management device 180 and/or the inventory management database 190. The consumer electronic device 170 may include but is not limited to a smart phone, cell phone, tablet, laptop, or the like.

Figure 4:
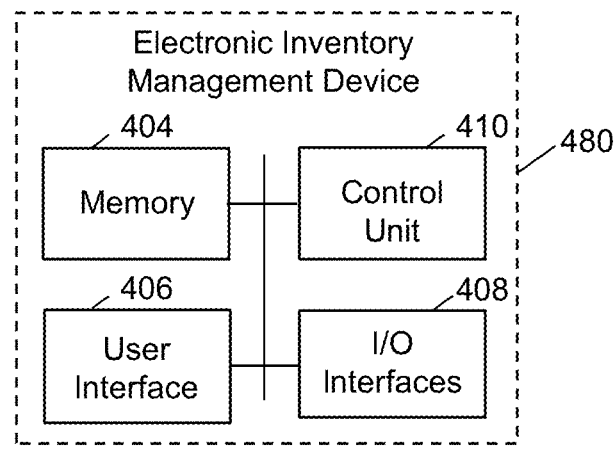
FIG. 4 is a simplified block diagram of an electronic inventory management device in accordance with some embodiments.

FIG. 4 shows a simplified block diagram of an exemplary electronic inventory management device 480, in accordance with some embodiments. The electronic inventory management device 480 includes one or more processor-based control circuits or control unit 410, memory 404, and input/output (I/O) interfaces 408. The electronic inventory management device 480 also includes one or more user interfaces 406 that allows users to interact with the inventory management database 190, worker interface device 160, and/or consumer electronic device 170.

In some embodiments, the control unit 410 includes one or more processors and/or microprocessors. The control unit 410 couples with and/or includes the memory 404. Generally, the memory 404 stores the operational code or set of instructions that is executed by the control unit 410 and/or processor to implement the functionality of the electronic inventory management device 480. It is understood that the control unit 410 may be implemented as one or more processor devices as are well known in the art. Similarly, the memory 404 may be implemented as one or more memory devices as are well known in the art, such as one or more processor readable and/or computer readable media and can include volatile and/or nonvolatile media, such as RAM, ROM, EEPROM, flash memory and/or other memory technology. In some embodiments, the control unit 410 comprises a fixed-purpose hard-wired platform or can comprise a partially or wholly programmable platform. These architectural options are well known and understood in the art and require no further description here. The control unit 410 can be configured (for example, by using corresponding programming as will be well understood by those skilled in the art) to carry out one or more of the steps, actions, and/or functions described herein.

While the memory 404 is shown as internal to the electronic inventory management device 480, the memory 404 can be internal, external or a combination of internal and external memory. Also, the electronic inventory management device 480 may include a power supply (not shown) or it may receive power from an external source. In some instances, the control unit 410 and the memory 404 may be integrated together, such as in a microcontroller, application specification integrated circuit, field programmable gate array or other such device, or may be separate devices coupled together.

The one or more I/O interfaces 408 allow wired and/or wireless communication coupling of the electronic inventory management device 480 to external components, such as the inventory management database 190, worker interface device 160, and/or consumer electronic device 170, and other such components. Accordingly, the I/O interfaces 408 may include any known wired and/or wireless interfacing device, circuit and/or connecting device. For example, in some implementations, the I/O interface 408 includes one or more transceivers, receivers, and/or transmitters that provide wireless communication in accordance with one or more wireless protocols (e.g., Wi-Fi, Bluetooth, radio frequency (RF), cellular, other such wireless communication, or combinations of such communication).

The user interface 406 of the electronic inventory management device 480 can include substantially any known input device, such one or more buttons, knobs, selectors, switches, keys, touch input surfaces and/or displays, etc. Additionally, the user interface 406 may include one or more output display devices, such as lights, visual indicators, display screens, etc. to convey to a user any information relating to product placement at the retailer facility 115. While FIG. 4 illustrates the exemplary components of the electronic inventory management device 480 being coupled together via a bus, it is understood that the components may actually be coupled to the control unit 410 and/or one or more other components directly.

In some embodiments, the control unit 410 of the electronic inventory management device 480 is configured to randomly generate, for an item 110, a set of electronic data corresponding to unique identifier 150 for a label 130 associated with an item 110. In some embodiments, the unique random identifier 150 may be generated in the form of a barcode (see FIG. 2), QR code (see FIG. 3), alphanumeric characters, non-alphanumeric graphical patterns such as one or more lines or other geometric or irregular shapes, RFID tag, smart label, or the like.

In some embodiments, the control unit 410 of the electronic inventory management device 480 may be programmed in some embodiments to query the inventory management database 190 to obtain information (e.g., tracking, order status, condition, etc.) pertaining to an item 110. Such information may be associated in the inventory management database 190 with the randomly generated identifier 150 transmitted to the electronic inventory management device 480 from a worker interface device 160 or a consumer electronic device 170 in response to a scanning of a label 130 on the item 110. The information obtained by the electronic inventory management device 480 from the inventory management database 190, in some embodiments, is transmitted back to the worker interface device 160 and/or the consumer electronic device 170 to provide a worker and/or a consumer with various information pertaining to the scanned item 110.

Figure 5:
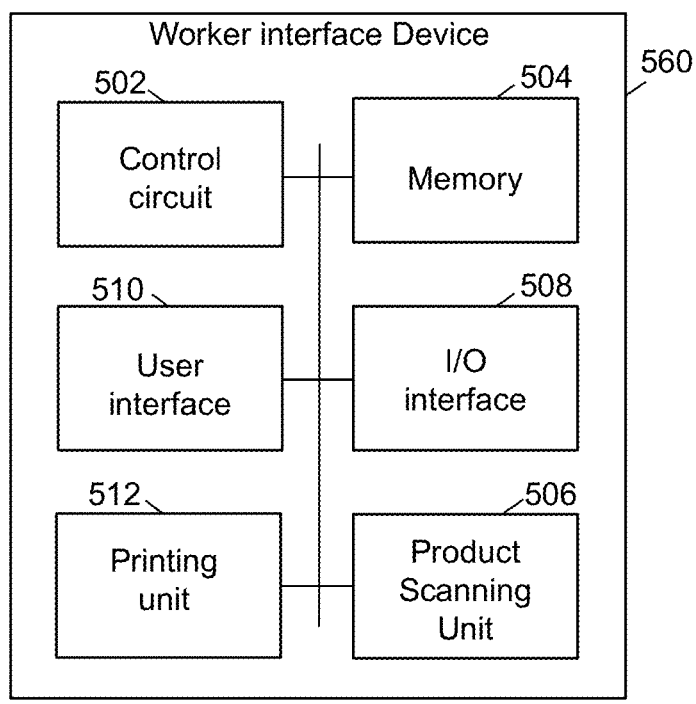
FIG. 5 shows a simplified block diagram of an exemplary worker interface device, in accordance with some embodiments.

FIG. 5 shows a simplified block diagram of an exemplary worker interface device 560, in accordance with some embodiments. The worker interface device 560 includes one or more control circuits 502, memory 504, input/output (I/O) interfaces 508, and user interfaces 510. In some embodiments, the worker interface device 560 may include a product scanning unit 506 (e.g., barcode reader, radio frequency identification (RFID) reader, optical reader, or the like) and a printing unit 512. In some embodiments, the control circuit 502 includes one or more processors and/or microprocessors. The memory 504 stores the operational code or set of instructions that is executed by the control circuit 502 and/or processor to implement the functionality of the worker interface device 560. In some embodiments, the memory 504 may also store some or all of particular data that may be needed to make any of the associations, determinations, and/or communications described herein. Such data may be pre-stored in the memory, received from an external source (e.g., the electronic inventory management device 480), be determined, and/or communicated to the user interface unit.

The control circuit 502 and/or processor may be implemented as one or more processor devices as are well known in the art. Similarly, the memory 504 may be implemented as one or more memory devices as are known in the art, such as one or more processor readable and/or computer readable media and can include volatile and/or nonvolatile media, such as RAM, ROM, EEPROM, flash memory and/or other memory technology. Further, the memory 504 is shown as internal to the worker interface device 560, but the memory 504 can be internal, external or a combination of internal and external memory. Additionally, the worker interface device 560 may include a power supply (not shown) that may be rechargeable and/or it may receive power from an external source. While FIG. 5 illustrates the components of the worker interface device 560 being coupled together via a bus, it is understood that the components of the user interface device 140 may be coupled to the control circuit 502 and/or one or more other components directly.

Generally, the control circuit 502 and/or electronic components of the worker interface device 560 can include fixed-purpose hard-wired platforms or can comprise a partially or wholly programmable platform. These architectural options are well known and understood in the art and require no further description here. The user interface unit and/or control circuit can be configured (for example, by using corresponding programming as will be well understood by those skilled in the art) to carry out one or more of the steps, actions, and/or functions described herein. In some implementations, the control circuit 502 and the memory 504 may be integrated together, such as in a microcontroller, application specification integrated circuit, field programmable gate array or other such device, or may be separate devices coupled together.

The I/O interface 508 allows wired and/or wireless communication coupling of the worker interface device 560 to external components, such as the electronic inventory management device 180 and/or the inventory management database 190 shown in FIG. 1. Typically, the I/O interface 508 provides at least wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitter, receiver, transceiver, etc. The user interface 510 may be used for user input and/or output display. For example, the user interface 510 may include any known input devices, such one or more buttons, knobs, selectors, switches, keys, touch input surfaces, audio input, and/or displays, etc. Additionally, the user interface 510 may include one or more output display devices, such as lights, visual indicators, display screens, etc. to convey information relevant to the labels 130 and/or the items 110 to a user such as a worker at the retailer facility 115 and/or to a consumer. The user interface 510 in some embodiments may also include audio systems that can receive audio commands or requests verbally issued by a user, and/or output audio content.

In some embodiments, the worker interface device 560 includes a product scanning unit 506 configured to scan a label 130 to detect the unique randomly-generated identifier 150 present on the label 130. As discussed above, the randomly-generated identifier 150 on the label 130 that may be scanned by the product scanning unit 506 may include, but is not limited to: two dimensional barcode, alphanumeric characters, non-alphanumeric characters, RFID, NFC identifiers, ultra-wideband (UWB) identifiers, Bluetooth identifiers, images, or other optically readable, radio frequency detectable or other such code, or combination of such codes. The worker interface device 560 according to some embodiments may include a printing unit 512. The printing unit 512 can be configured to allow the worker interface device 560 to print one or more labels 130 including the randomly generated identifiers 150 that may be affixed to the items 110 at a retailer facility 115. As such, a worker at a retailer facility 115 may be instructed by an on-screen message on the worker interface device 560, instructing the worker to print, using the printing unit 512 of the worker interface device 560, a label 130 having a randomly generated identifier 150 that uniquely identifies the item 110, and to apply the printed label 130 onto the item 110.

Figure 6:
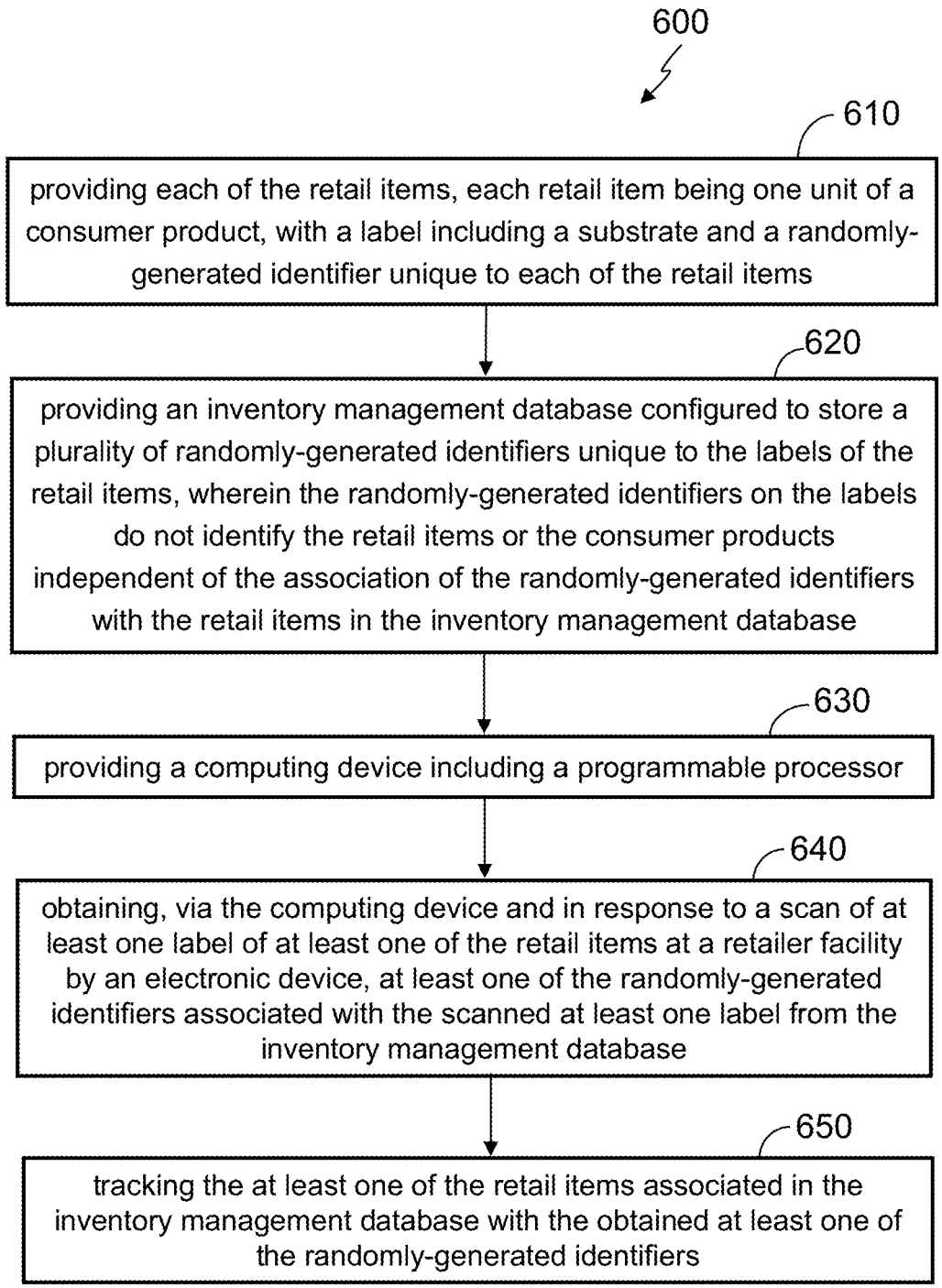
FIG. 6 is a flow diagram of a process of tracking retail items labeled with unique randomly-generated identifiers, in accordance with some embodiments.

FIG. 6 illustrates a simplified flow diagram of an exemplary process 600 of method of tracking a retail item 110 labeled with a label 130 including a unique randomly-generated identifier. While the process 600 will be discussed as it applies to the item 110 of FIG. 1, it will be appreciated that the process 600 may be utilized in connection with any of the embodiments described herein.

The exemplary method 600 of FIG. 6 includes providing each of the retail items 110 (with each retail item 110 being one unit of a consumer product) with a label 130 including a substrate 132 and a randomly-generated identifier 150 unique to each of the retail items 110 (step 610). For example, the control unit of the electronic inventory management device 180 at a retail facility 115 may be programmed to randomly generate a unique identifier 150 for association with a label 130 that will be affixed to an item 110. Alternatively, the unique identifier 150 may be generated by a computing device of a vendor (e.g., manufacturer) prior to delivery of the item 110 to the retailer facility 115. As discussed above, the unique randomly-generated identifier 150 may be generated in the form of a barcode (see FIG. 2), QR code (see FIG. 3), alphanumeric characters, non-alphanumeric graphical patterns such as one or more lines or other geometric or irregular shapes, RFID tag, smart label, and/or the like As described above, the control circuit (e.g., control unit 410) of the electronic inventory management device 180 associates the unique identifier 150 randomly generated for an item 110 with the identifier for that item 110 (e.g., manufacturer-specific code and/or product-specific code for the item 110) stored in a record of an electronic database 190, such that the randomly-generated identifier 150 is uniquely associated with the item 110 in the electronic database 190. The exemplary method 600 includes providing an inventory management database 190 configured to store a plurality of randomly-generated identifiers 150 unique to the labels 130 of the retail items 110 such that the randomly-generated identifiers 150 on the labels 130 do not identify the retail items 110 or the consumer products independent of the association of the randomly-generated identifiers 150 with the retail items 110 in the inventory management database 190 (step 620). As described above, given that each item 110 processed at the retailer facility 115 is uniquely identified by the randomly-generated identifier 150, each item 110 located at the retailer facility 115 and/or being transported to or from the retailer facility 115 may be accurately tracked by a worker at the retailer facility 115 and/or by a consumer who purchased the item 110.

Step 630 of the exemplary method of FIG. 6 includes providing a computing device (e.g., electronic inventory management device 180) including a programmable processor (e.g., control unit 410). In some aspects, the electronic inventory management device 180 facilitates the creating of a label 130 comprising a substrate 132 and the unique randomly-generated identifier 150 associated with the item 110. For example, the label 130 may be printed via the electronic inventory management device 180, a printing device at the retailer facility 115 in communication with the electronic inventory management device 180, the worker interface device 160, and/or a printing device at a vendor facility. For example, the printing of the label 130 may be performed in some embodiments by the printing unit 512 of the worker interface device 560 upon receiving a signal from the electronic inventory management device 480 (e.g., after the control unit 410 of the electronic inventory management device 480 generates the unique random identifier 150 for a label 130 associated with an item 110).

In some embodiments, after a label 130 is created, the label 130 is applied to the item 110. As described above, the application of a label 130 to the item 110 may include a worker (e.g., at a vendor facility or at the retailer facility 115) peeling a backer off the substrate 132 and affixing the label 130 via an adhesive found on a rear side of the substrate 132 to the item 110. It will be appreciated that the label may likewise be applied by an automated device such as a robotic arm or the like, for example in a two-step automated sequence of printing the label 130 and applying the label 130 to the item 110 or the packaging of the item 110. It will be appreciated that instead of printing a physical label 130 and affixing such a label 130 via an adhesive to an exterior surface of the item 110, a label 130 in digital or optical form may be created, and such a label may be directly printed on to the body of the item 110.

As discussed above, in some embodiments, the label 130 is configured such that the randomly-generated identifier 150 on the label 130 is scanable by an electronic device (e.g., worker interface device 160, consumer electronic device 170, etc.). The exemplary method 600 of FIG. 6 includes obtaining, via the computing device (e.g., electronic inventory management device 190) and in response to a scan of at least one label 130 of at least one of the retail items 110 at a retailer facility by an electronic device (e.g., 160, 170, etc.), at least one of the randomly-generated identifiers 150 associated with the scanned at least one label 150 from the inventory management database 180 (step 640). For example, a worker handling an item 110 having the label 130 thereon may scan the item 110 to read the unique randomly-generated identifier 150 on the item 110 and obtain various inventory management information relating to the item 110 as described above.

In the embodiment illustrated in FIG. 6, the method 600 includes tracking the at least one of the retail items 110 associated in the inventory management database 180 with the obtained at least one of the randomly-generated identifiers 150 (step 650). For example, in some embodiments, after a label 130 of a retail item 110 is scanned as described above, the control unit 410 of the electronic inventory management device 480 queries the inventory management database 190 to obtain information (e.g., tracking, order status, condition, etc.) associated with the scanned item 110. In some aspects, such information is associated in the inventory management database 190 with the randomly generated identifier 150 transmitted to the electronic inventory management device 480 from a worker interface device 160 or a consumer electronic device 170 in response to a scanning of a label 130 on the item 110. The information obtained by the electronic inventory management device 480 from the inventory management database 190, in some embodiments, is transmitted back to the worker interface device 160 and/or the consumer electronic device 170 to provide a worker and/or a consumer with tracking information pertaining specifically to the scanned item 110.

The systems and methods described herein provide for labeling of products with a unique randomly-generated identifier that permits workers at retailer facilities to accurately and easily track the uniquely-labeled items processed at the retailer facilities, and enable retailer facilities to accurately account for each item that is delivered to or shipped from the retailer facility. In addition, the labels including the randomly-generated unique identifiers as described herein may be advantageously faster to process than conventional UPC barcodes, as the scanning of conventional UPC barcodes requires location scans by the workers to track the inventory and complicates the identification of each worker that handles the items, while the use of the labels as described herein advantageously eliminates the need for location scans. In addition, the labels as described herein provide an additional layer of quality assurance, as the unique identifier present on each item handled by a worker enables the identification of each worker who handled the unit, and more importantly in cases of misplaced items, which worker was the last to handle the misplaced item. Accordingly, the systems and methods described herein advantageously improve worker efficiency and provide for significant cost savings to the retail sales facilities.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating tracking, by retailers, of retail items labeled by the retailers with unique randomly-generated identifiers, the system comprising:
   a plurality of retail items, each of the retail items being an individual unit of a consumer product and including:
      a manufacturer label including a uniform product code indicating a manufacturer of the consumer product and a product code of the consumer product; and
      a retailer label separate from the manufacturer label and comprising a substrate and a randomly-generated identifier unique to the individual unit of the consumer product, the randomly-generated identifier of each of the individual units of the consumer product being distinct from one another;
   an inventory management database configured to associate the randomly-generated identifiers on the retailer labels with their respective individual units of the consumer product, wherein the randomly-generated identifiers on the retailer labels do not identify the individual units of the consumer products independent of the association of the randomly-generated identifiers with their respective individual units of the consumer products in the inventory management database; and
   a computing device including a programmable processor and being programmed to obtain, in response to a scan of at least one retailer label of at least one of the individual units of the consumer product at a retailer facility by an electronic device, at least one of the randomly-generated identifiers associated with the scanned at least one retailer label from the inventory management database in order to uniquely identify the at least one of the individual units of the consumer product and to track at least one worker task associated with the at least one of the individual units of the consumer product associated in the inventory management database with the obtained at least one of the randomly-generated identifiers.

2. The system of claim 1, wherein the randomly-generated identifier does not represent the uniform product code associated with the consumer product, and wherein the retailer label does not include the uniform product code associated with the consumer product.

3. The system of claim 1, wherein the randomly-generated identifier includes at least one of: a plurality of alphanumeric characters, a barcode, a quick response (QR) code, and a radio frequency identification (RFID) tag.

4. The system of claim 1, further comprising at least one of a date stamp, time stamp, origin stamp, and user stamp indicating a date when the retailer label was placed by a worker of the retailer on each of the individual units of the consumer product, a time when the retailer label was placed by the worker of the retailer on each of the individual units of the consumer product, a location where the label was placed by the worker of the retailer on each of the individual units of the consumer product, and the worker of the retailer who placed the retailer label on each of the individual units of the consumer product, respectively.

5. The system of claim 1, wherein the randomly-generated identifier is configured to indicate whether an individual unit of the consumer product associated with the randomly-generated identifier in the inventory management database is new, refurbished, or used.

6. The system of claim 1, further comprising brand indicia on the retailer label for each of the individual units of the consumer product, wherein the brand indicia includes at least one of manufacturer identification and retailer identification for each of the retail items, and wherein the brand indicia is at least one of incorporated into the randomly-generated identifier and visibly separate from the randomly-generated identifier.

7. The system of claim 1, further comprising item-specific information associated with each of the individual units of the consumer product, the item-specific information including at least one of a present location of each of the individual units of the consumer product, a present status of each of the individual units of the consumer product, an expiration date of each of the individual units of the consumer product, an identification of a delivery vehicle used to transport each of the individual units of the consumer product, and an identification of a worker of the retailer who handled each of the individual units of the consumer product at a product distribution facility or the retailer facility.

8. The system of claim 1, wherein the retailer label is configured such that the randomly-generated identifier is scanable at the retailer facility by a personal electronic device of a consumer and such that such that each of the retailer labels is detachable from a respective one of the individual units of the consumer product by the consumer.

9. The system of claim 8, wherein the retailer label is configured such that a scan of the randomly-generated identifier by the personal electronic device of a consumer results in at least one of an addition of the respective one of the retailer items to a shopping cart of a consumer and an automatic reorder of the respective one of the individual units of the consumer product for the consumer.

10. The system of claim 1, wherein the randomly-generated identifier corresponds in the inventory management database to at least one of consumer product identification code, a unique item code, and additional data associated with a respective one of the individual units of the consumer product.

11. A method of facilitating tracking, by retailers, of retail items labeled by the retailers with unique randomly-generated identifiers, the method comprising:
   providing each of the retail items, each of the retail items being an individual unit of a consumer product, with:
      a manufacturer label including a uniform product code indicating a manufacturer of the consumer product and a product code of the consumer product; and
      a retailer label separate from the manufacturer label and including a substrate and a randomly-generated identifier unique to the individual unit of the consumer product, the randomly-generated identifier of each of the individual units of the consumer product being distinct from one another;
   providing an inventory management database configured to associate the randomly-generated identifiers on the retailer labels with their respective individual units of the consumer product, wherein the randomly-generated identifiers on the retailer labels do not identify the individual units of the consumer products independent of the association of the randomly-generated identifiers with their respective individual units of the consumer product in the inventory management database;

providing a computing device including a programmable processor;

obtaining, via the computing device and in response to a scan of at least one retailer label of at least one of the individual units of the consumer product at a retailer facility by an electronic device, at least one of the randomly-generated identifiers associated with the scanned at least one retailer label from the inventory management database; and uniquely identifying the at least one of the individual units of the consumer product and tracking at least one worker task associated with the at least one of the individual units of the consumer product associated in the inventory management database with the obtained at least one of the randomly-generated identifiers.

12. The method of claim 11, wherein the providing step further includes generating the random identifier not representing the uniform product code associated with the consumer product, and wherein the generating step does not include generating the uniform product code associated with the consumer product represented by the retailer label.

13. The method of claim 11, wherein the providing step further includes generating the random identifier including at least one of: a plurality of alphanumeric characters, a barcode, a quick response (QR) code, and a radio frequency identification (RFID) tag.

14. The method of claim 11, further comprising generating at least one of a date stamp, time stamp, origin stamp, and user stamp on the retailer label indicating a date when the retailer label was placed by a worker of the retailer on each of the individual units of the consumer product, a time when the retailer label was placed by a worker of the retailer on each of the individual units of the consumer product, a location where the retailer label was placed by a worker of the retailer on each of the individual units of the consumer product, and the worker of the retailer who placed the retailer label on each of the individual units of the consumer product, respectively.

15. The method of claim 11, wherein the providing step further includes generating the random identifier indicating whether an individual unit of the consumer product associated with the randomly-generated identifier in the inventory management database is new, refurbished, or used.

16. The method of claim 11, further comprising generating brand indicia on the label for each of the individual units of the consumer product, wherein the brand indicia includes at least one of manufacturer identification and retailer identification, and further comprising at least one of incorporating the brand indicia into the randomly-generated identifier and generating the brand indicia on the retailer label in a location that is visibly separate from the randomly-generated identifier.

17. The method of claim 11, further comprising generating item-specific information on the retailer label associated with each of the individual units of the consumer product, the item-specific information including at least one of a present location of each of the individual units of the consumer product, a present status of each of the individual units of the consumer product, an expiration date of each of the individual units of the consumer product, an identification of a delivery vehicle used to transport each of the individual units of the consumer product, and an identification of a worker of the retailer who handled each of the individual units of the consumer product at a product distribution facility or the retail sales facility.

18. The method of claim 11, wherein the providing step further comprises generating the randomly-generated identifier that is scanable by a personal electronic device of a consumer, and wherein the providing step further comprises applying the retailer label to each of the individual units of the consumer product as a detachable label such that the retailer label is detachable from a respective one of the individual units of the consumer product by the consumer.

19. The method of claim 18, further comprising, in response to a scan of the randomly-generated identifier on the retailer label of at least one of the individual units of the consumer product by the personal electronic device of a consumer, at least one of adding the at least one of the individual units of the consumer product to a shopping cart of a consumer and automatically reordering the at least one of the individual units of the consumer product for the consumer.

20. The method of claim 11, wherein the providing step further includes generating the randomly-generated identifier corresponding in the inventory management database to at least one of consumer product identification code, a unique item code, and additional data associated with a respective one of the individual units of the consumer product.

* * * * *